United States Patent

Moussette

[15] 3,644,685

[45] Feb. 22, 1972

[54] MANUAL MAGNETIC RECORDER

[72] Inventor: Oliver Moussette, New York, N.Y.

[73] Assignee: M.G. Dynamics, Inc., New York, N.Y.

[22] Filed: Aug. 6, 1969

[21] Appl. No.: 847,846

[52] U.S. Cl. ..........179/100.2 B, 179/100.2 CF, 179/100.2 S

[51] Int. Cl. ....................G11b 5/12, G11b 5/36, G11b 27/02

[58] Field of Search ............179/100.2 B, 100.2 CF, 100.2 T, 179/100.2 S

[56] References Cited

UNITED STATES PATENTS

| | | | |
|---|---|---|---|
| 2,734,948 | 2/1956 | Mueller | 179/100.2 |
| 3,031,534 | 4/1962 | Trumble | 179/100.2 |
| 3,500,432 | 3/1970 | Grant | 179/100.2 |

OTHER PUBLICATIONS

Haynes, N. M.: Transistor Circuits for Magnetic Recording p. 196, 197 Sams, '64

*Primary Examiner*—Bernard Konick
*Assistant Examiner*—Jay P. Lucas
*Attorney*—March, LeFever, Wyatt & Lazar

[57] ABSTRACT

A handheld device for recording magnetic cueing and starting signal information on a magnetizable surface such as used on motion-picture film. A recording head is passed over the film and across the gap head an alternating mmf. is generated by a rotated magnet or an electromagnetic coil synchronized to the movement of the gap.

4 Claims, 6 Drawing Figures

INVENTOR.
OLIVER MOUSSETTE
BY
March, LeFever, Wyatt & Lazar
ATTORNEYS

INVENTOR
OLIVER MOUSSETTE
BY
March, LeFever, Wyatt & Lazar
ATTORNEYS

INVENTOR.
OLIVER MOUSSETTE
BY
March, LeFever, Wyatt & Lazar
ATTORNEYS

MANUAL MAGNETIC RECORDER

This invention relates to apparatus for recording signals on a magnetic surface and more particularly for recording signals on a stationary magnetic surface for subsequent reproduction on other devices from such a surface while moving.

The principal object of the invention is to induce a tone or pulse of short duration, that is, to induce a tone or pulse from a strip of magnetic material equal in length to a single frame of a picture field.

Heretofore, the method of inserting the audible start marks or cueing pulses consisted of physically cutting a short length of a prerecorded tape or track and splicing it into the sound tract at the selected portion of the tape or film. Other methods consist of overlying as by pasting with an adhesive a short length of such prerecorded tape over the magnetic track area or portion of the tape or film. Both these methods are inefficient since they are not only time consuming but they are also quite costly.

The previous method of splicing prerecorded tape is the least desirable because of the time wasted in splicing and furthermore the life of such magnetic tape is limited in the number of repetitive splices to which it can be subjected. The overlie method creates problems such as improper alignment and uneven tape-to-head contact while the film is traveling over the reading or reproduction head. An action known as the "bounce" effect causes erratic signals. Furthermore, many of the adhesives are ineffective in establishing a continuous cohesive contact resulting in bubbles and actual separation of the overlaid prerecorded tape from the main tape or film.

The audible start or cueing pulses are inserted or applied during the preparation or editing of sound tapes or film tracks while the magnetic film or tape is stationary. Since the means to effect a recording of such signals must be flexible in use, it is highly desirable that a device that effects such a magnetic recording be portable and be quite small for manual portage and use. The problem of such a device is solved in accordance with this invention.

It is an object of this invention to provide a magnetic modulator or recorder head that impresses magnetic patterns on a magnetizable media while the media is stationary.

It is a further object of this invention to provide magnetic patterns that are compatible with present industrial standards, as for example, being able to develop a signal that is reproducible on conventional playback or pickup (reading) heads.

It is still a further object of this invention to record on magnetic tape or film a fixed-frequency tone as, for example, a sine wave shape electrical signal of short duration which functions as a synchronizing or control signal.

It is still a further object of this invention to provide a device that can be handheld and easily transportable and yet be inexpensive to manufacture.

It is a further object that such a device include means for controlling the frequency of the modulations to a fixed or constant value.

The invention will now be better understood by a description of several embodiments thereof by reference to the accompanying drawing of which the following is a brief description thereof and by further reference to a detailed description of those embodiments.

Figure 1:
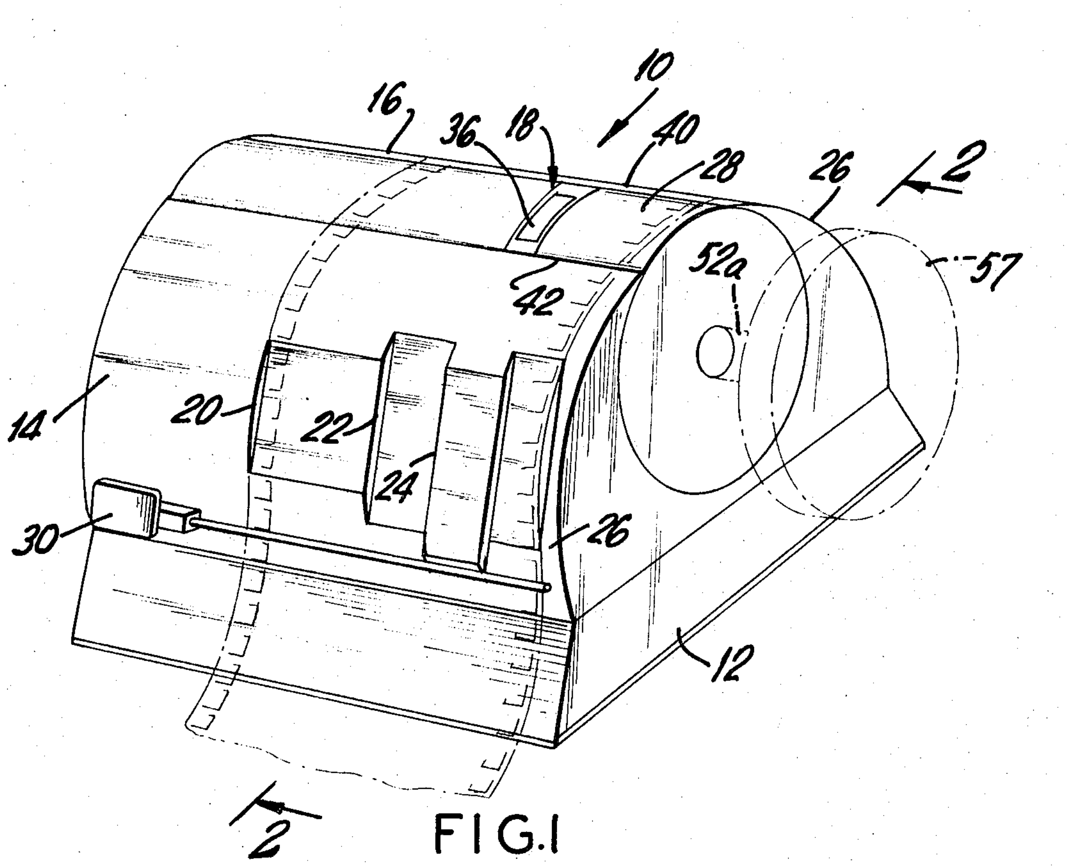
FIG. 1 is a perspective view of the assembled device according to the invention.

Referring now to the drawing, the recorder 10 of the invention is shown in assembled form in FIG. 1. The housing is mounted in a base 12. The housing comprises a front cylindrical portion 14 and a rear cylindrical portion 16 the interior surfaces of which are crescent shaped to partially encircle the rotatable revolving recording head 18. The front and rear portions 14 and 16 are provided with a series of ridges 22, 20, 24, each set serving as film guides, each being suitably positioned to accommodate any of the conventional sized films, tapes or sound tracks used in the art. The right end (as seen from FIG. 1) may be provided with a ridge or flange 26 on the front and rear portions 16 and 14 as well as the flange 28 on the head 18. A spring-loaded pressure device 30 is provided on the lower portion of the outer face under which the film or tape is threaded and held in firm, taut position in cooperation with a similar pressure device located in a similar position on the rear portion 16 (not seen in FIG. 1).

According to the invention, I arrange the rotating recording drum to make one revolution during which time a magnetic signal is recorded on the magnetic portion of the tape located over the head gap 36. The head gap is arranged to pass from edge 40 to edge 42 of the respective front and rear portions 14 and 16. Simultaneously, the polarity of the pole pieces is respectively changed or alternated to develop an alternating magneting flux across the gap 36.

Figure 2:
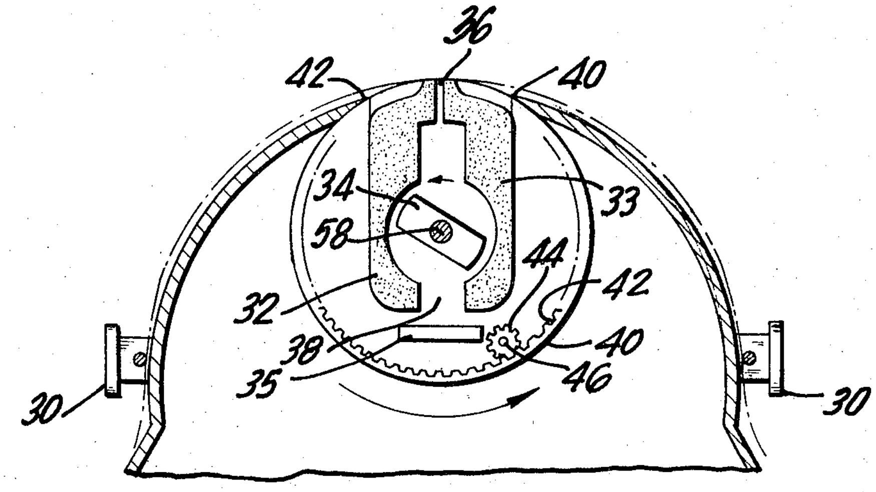
FIG. 2 is a sectional view of the device shown in FIG. 1 as seen along viewing line 2—2 thereof.
Figure 3:
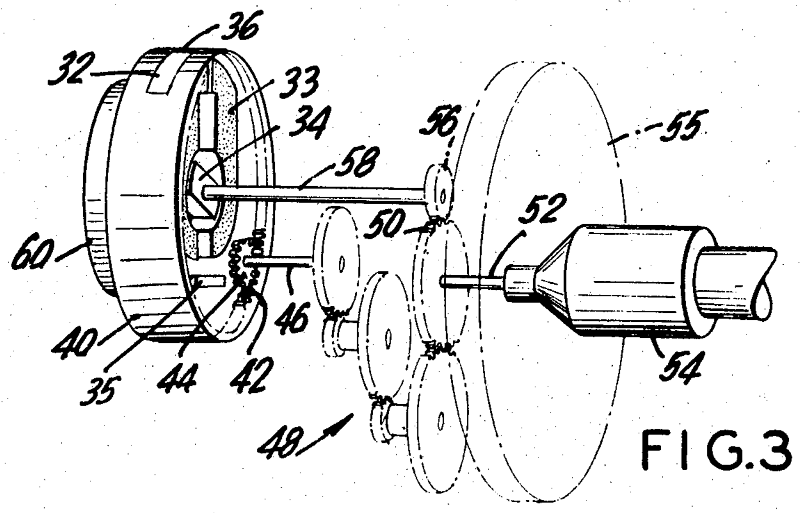
FIG. 3 is a sectional view shown partly in perspective as seen along the longitudinal axis of the device with the cover removed.

Referring now to FIGS. 2 and 3, there is shown one embodiment of the invention for providing the means for effecting such a magnetic recording signal. The rotating recording head is formed on a cylindrical drum 40 provided with gear teeth 42 on the inner surface. The drum 40 is mounted to rotate about its central axis driven by the gear 44 connected to shaft 46 which is the output of gear train 48 coupled to gear 50 attached to shaft 52 of the drive motor 54. Drive motor 54 may be powered by a battery or it may be a spring-loaded type arranged for one-cycle operation. Also coupled to gear 50 is gear 56 attached to magnet shaft 58 which is connected to the rotation axis of a rotating magnet 34. Embracing the magnet 34 are two pole pieces 32 and 33 formed preferably of high-permeability, high $\mu$ ferrite material to develop the maximum mmf. The magnet 34 is also made of ferrite material as a permanent magnet of high mmf., or other materials.

The width of the magnet 34 is preferably smaller than the width of the pole pieces, particularly at the facing portions. Adjustment of the axial position of the magnet 34 relative to the pole pieces provides means to alter the amplitude of the mmf. across gap 36. The bearing 60 assures a smooth rotation of the drum 40. The upper portions (as seen in FIG. 2) of pole pieces 32 and 33 are separated for usual designs by a gap 36 of about 0.00025 to 0.00050 inch (one-fourth to one-half mils). The lower portion of the pole pieces may be provided with a similar gap 38 making it less sensitive to surrounding magnetic fields. Bar magnet 35 suitably positioned relative to air gap 38 may be used to still further improve linearity across the recording gap 36. The width of the pole pieces is usually 0.200 inch while for certain applications the width may be as little as 0.04 inch. In operation as the drum is rotated by the gear 44 from the motor 54 the magnet 34 is also rotated but at a much greater rate. If a 750-hertz signal is desired for a reproduction tape velocity of 7.5 i.p.s. (inches per second), then 100 cycles of modulation (magnetic indicia) is required per inch. Assuming the outer circumference of the rotating head 18 to be 3 inches, the head energizing magnet 34 must rotate 300 revolutions to one revolution of the head 18, i.e., a ratio of 300:1. This factor becomes an integral of modulator frequency. Hence, the rotation speed of the magnet 34 does not affect the modulation frequency of the recording device. The device is significantly useful since the motor torque and the associated drive apparatus are not critical in design criteria to develop an accurate modulator frequency. Furthermore, the time required to modulate a small area of tape is not critical since the purpose of the recorder device is to record in a matter of seconds a recordation function which by any of the previous known methods require many minutes. According to a practical design, the rotation speed of recorder head 18 may be one revolution during a 3-second interval, which is equivalent to a rotation speed of 20 r.p.m. Accordingly, assuming a ratio of 300:1 for the rotation of the magnet 34 relative to the rotation of recorder head 18, the energizing magnet 34 must be rotating at a rate of 6,000 r.p.m.

Figure 4:
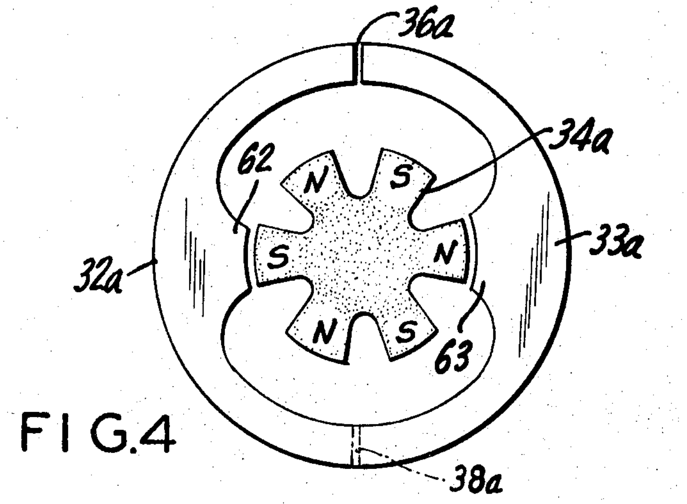
FIG. 4 is a diagrammatic view of a typical pole piece and armature as viewed along the longitudinal axis.

Referring to FIG. 4, a modification of the system just described comprises pole pieces 32*a* and 33*a* surrounding a triple pair of integral magnets 34*a*. The pole pieces are provided with the inner extensions 62 and 63 to increase the efficiency of developing the magnetic flux across the head gap 36*a*. Additional pole pieces also reduce the rotation speed requirements of the magnet 34*a*. Thus advantageously the magnet 34*a* may be a cylinder with a plurality of ferrite pole pieces approximately butted on the surface thereof. The pole pieces 32*a* and 33*a* are of soft iron having a high $\mu$, while the magnet 34*a* is a ferrite or any suitable permanent magnetic material.

An inertia handwheel 55 may be included as shown in FIG. 3 mounted on shaft 52 to serve as a starter in the event the gear train is bound. Further the wheel 55 may serve as the sole power source by manual operation. The gear train 48 in operation has inertia that eases the continuous power action needed. To provide a manually powered recorder according to the invention, I provide a knob 57 attached to shaft 52*a* extending through the end wall of the housing. It should be noted that according to the invention the knob 57 need not be rotated continuously or at a constant rate owing to the coordinated relation of the gap (36) movement and the magnet (34) movement.

Figure 5:
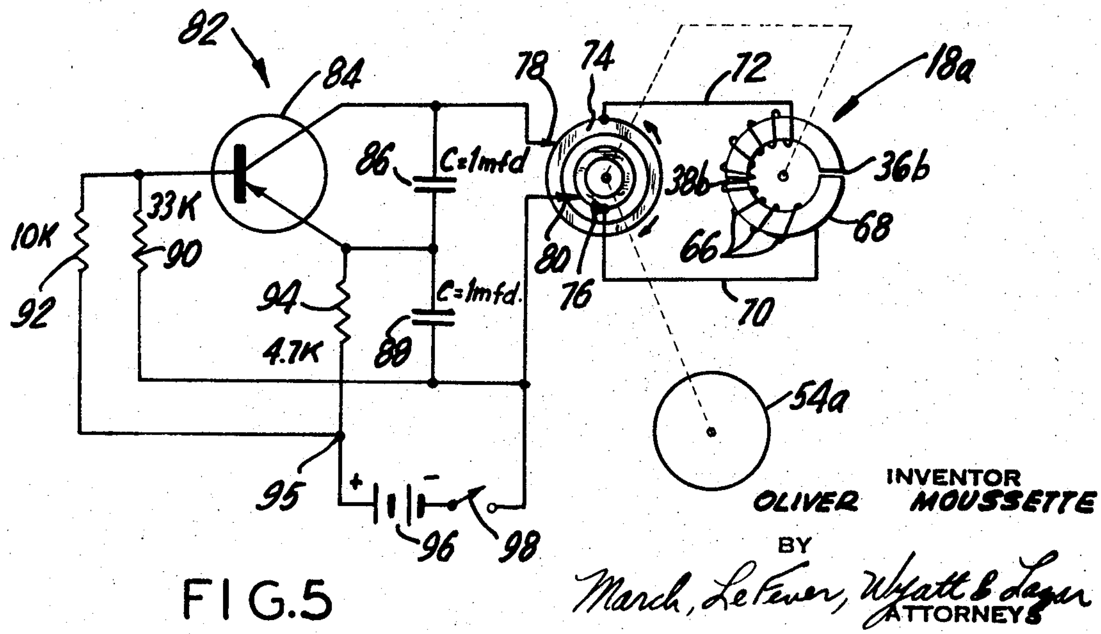
FIG. 5 is a schematic electrical diagram of a modification of the invention wherein the inductive reactance of the recording head is included in a resonant circuit, the resonant frequency of which is determined in part by the rotation of the recording head.

According to a still further modification of the invention, I utilize a tuned circuit as a component part of the inductive reactance of an electromagnetic pole piece to develop the mmf. across the flux gap. Referring to FIG. 5, there is shown a simplified electrical schematic of a circuit embodying this form of the invention.

The circuit of FIG. 5 incorporates a Colpitts-type oscillator in transistorized form. The magnetizing head 18*a*, according to this embodiment, is rotated directly or through an appropriate gear train by an AC synchronous motor, or a DC constant speed motor 54*a*. The shaft of the recording head is provided with a slipring commutator arrangement for maintaining continuous electric connections between the rotating head 18*a* and the other components remotely located.

Suitable windings 66 are provided on the core 68 of the recording head. The windings are connected by conductors 70 and 72 to sliprings 74 and 76 attached to the commutator of the motor. Brushes 78 and 80 provide electric connections from the sliprings to the oscillator portion 82. The oscillator consists of transistor 84, for example, a type 2N417, a 1.0 mfd. capacitor 86 connected across the collector and the emitter of the transistor. Another 1.0 mfd. capacitor 88 of the circuit is connected from the emitter, to the base through the 33K resistor 90. A resistor 92 of 10K value is connected in series with a 4.7K resistor 94 to the emitter and at their junction 95 the positive terminal of battery 96. Included in the battery supply leg is a switch 98, one terminal of which is connected to the slipring 80 in common with one terminal of the capacitor 88.

In operation, the circuit is arranged to oscillate at a desired frequency, say 750 Hz. The oscillator output produces a magnetic flux of sinusoidal form across the gap 36*b*. The gap is rotated within the housing 10 as described with respect to the first embodiment. Since the frequency of the oscillator is substantially constant and independent of the rotation of the gap, the rotation of the recording head 18 should be driven at a linear speed in order to avoid distortion in the magnetic indicia recorded on the magnetizable surface of the tape.

Figure 6:
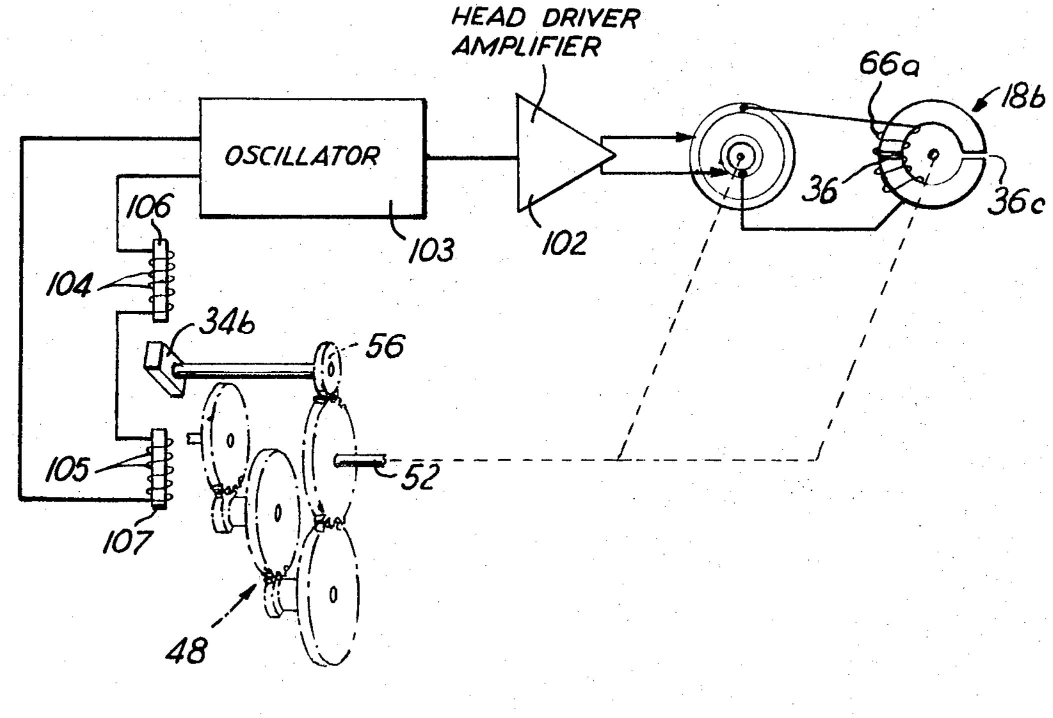
FIG. 6 is a schematic diagram of a modified form of oscillator.

The difficult requirement of establishing a linear and constant speed of rotation of the recording head 18 can be avoided by providing an oscillator circuit synchronized to the rotation of the gap 36*b*. Referring to FIG. 6, I arrange an oscillator that functions to satisfy this requirement.

In FIG. 6 there is shown a recording head 18*b* mechanically coupled to shaft 52 so that rotation of shaft 52 rotates head 18*b* as previously described. The inductive windings 66*a* are suitably connected by sliprings mounted on a common shaft or the like to the output of a head driver amplifier 102 which in turn is connected to the output of free running oscillator 103. The synchronizing voltages for oscillator 103 are produced by pickup coils 104 and 105 serially connected and wound on pole pieces 106 and 107 spacially related to the rotating magnet 34*b* for developing maximum mmf. The rotation of shaft 52 can be effected by an electric drive motor, a spring-loaded motor, or by an inertia thumb wheel, all of which have been previously described above.

In operation, rotation of the magnet 34*b* effects a magnetic flux through the pole pieces 106 and 107 producing thereby a voltage in coils 104 and 105 for gating the free running oscillator 103 to generate a voltage at a frequency and amplitude according to chosen design parameters.

The output of oscillator 103 is amplified by the head driver 102 to develop the required emf which in turn develops suitable voltage for the required mmf. recording gap 36*c* by means of the mmf. developed in the winding 66*a*.

According to this embodiment of the invention it will be appreciated that the synchronizing of the rotation of the recording head 18*b* is automatically established with the rotating magnet 34*b*.

According to this embodiment thus a precise recording frequency is developed and the recording speed may be varied without affecting the accuracy of the magnetic recording desired as well as not affecting the frequency of the mmf. at the recording gap 36*c*.

Erasure, in general, may be accomplished for certain applications, by a permanent magnet erase head positioned on a rotary drum, such as drum 18, so as to precede or lead the record head (36) as it makes its recording pass over the film. Other erasure technique will be apparent to those skilled in this art.

It will be appreciated by those skilled in the art in accordance with the principle of the invention embodied in a magnetic recording effected on a magnetic medium by moving a magnetic recording gap longitudinally over a fixed magnetizable surface, the same magnetic recording can be effected in a different embodiment wherein a fixed magnetic recording gap is associated with a magnetic medium moved thereover. Accordingly, the invention may be utilized in a system of similar structure as described in detail heretofore but modified to maintain the magnetic gap in fixed spacial position and to provide for a movement of the film thereover by a driving mechanism common and synchronized to both the mmf. generating system and a suitable film-advancing means.

Although several embodiments of the invention have been described with respect to recording magnetic indicia on the surface of tape film or the like, it should be appreciated that the invention has an application in many other fields of use. Thus, for example, the invention has utility in industrial control machines, particularly with respect to programming, timing, start signals and audio-fade control signals. It also may be used in automatically controlling slide projector devices to advance individual photographic slides in response to control signals applied to a previously prepared tape-recorded commentary for each slide.

Furthermore, the invention is useful in the television arts wherein the precise timing of footage of film is required. Heretofore the film has been physically punched with holes in order to establish a coded signal to indicate timed footages of the film. According to the invention the film may be timed easily by providing a magnetizable surface which may be recorded with a distinctive signal representative of a certain elapse of time or a certain total footage, or the like.

What I claim is:

1. In apparatus for recording a magnetic flux on a magnetizable surface, a recording head having a soft magnetic circuit with an airgap; means for generating an alternating magnetic flux across said airgap; a magnetizable surface; and means for effecting relative movement of the surface and the head in magnetic relation whereby the surface is magnetized in proportion to the alternating magnetic flux; said surface being stationary and said head being moved relative to said surface; said magnetic flux generating means including a permanent magnet, and means for rotating said magnet in flux producing relation to said soft magnetic circuit to develop an alternating flux across said airgap and means synchronizing the movement of said gap and said rotating magnet.

2. Apparatus according to claim 1 wherein said magnetic rotating means includes a rotating shaft attached to said magnet, said shaft being rotated by an electric motor.

3. In apparatus according to claim 1 wherein said means for moving said head includes a rotatable drum, said soft magnetic circuit being fixedly disposed along the inner surface of said drum, said airgap being disposed along the outer surface of said drum, gear teeth disposed along the inner surface of said drum, a spur gear in cooperative engagement with said gear teeth, and electric motor means for rotating said spur gear.

4. In apparatus according to claim 1 wherein said permanent magnet has a plurality of pole pairs and said soft magnetic circuit includes a pair of portions extending inwardly for making close magnetic coupling with a respective pair of said pole pairs as said permanent magnet is rotated.

* * * * *